UNITED STATES PATENT OFFICE 2,640,822

ACYLATED COMPLEX OXYGEN-CONTAINING POLYAMINES

Denham Harman, Berkeley, and Harry J. Sommer, Lafayette, Calif., assignors to Shell Development Company, San Francisco, Calif., a corporation of Delaware No Drawing. Application August 22, 1949, Serial No. 111,758

8 Claims. (Cl. 260—97.5)

This invention relates to a new composition of matter and to a method for the preparation of the same. More particularly, the present invention relates to a new and useful composition of matter comprising products of the reaction between suitable carboxylic acids and certain complex oxygen-containing polyamines to be described hereinafter, and to a process for the manufacture of the new products.

Briefly described, the new products to which the invention relates are products of the reaction at an elevated temperature between relatively high-molecular weight carboxylic acids and certain complex oxygen-containing polyamines, which complex oxygen-containing polyamines are those formed by catalytically hydrogenating the material produced by treating an alpha,beta-olefinic aldehyde or mixture of alpha,beta-olefinic aldehydes with an excess of ammonia or a primary amine.

The oxygen-containing polyamines which are employed in and for the preparation of the novel products to which the invention relates are amino materials having a complex undetermined structure. In general they are high-boiling, viscous liquids to soft solids and range in color from a light yellow or tan to a dark brown or dark reddish-brown. They are thought to be composed predominantly of complex mixtures of polymeric oxygen-containing polyalkylene polyamino compounds, comprising primary, secondary and even tertiary amino nitrogen atoms, a plurality of alkylene and alkyl groups, and containing, even in the simplest case, one or more products having a branched-chain, and in some cases even a closed-chain or cyclic structure.

The average or apparent molecular weight of these complex oxygen-containing polyamines, which may be determined cryoscopically or ebulliometrically according to known methods, depends in part upon the molecular weight of the alpha,beta-olefinic aldehyde from which the polyamines were prepared. In general, when the alpha,beta-olefinic aldehyde is reacted with ammonia and the products are hydrogenated, the average or apparent molecular weight of a suitable complex oxygen-containing polyamine is from about 2½ to about 10 times the molecular weight of the alpha,beta-olefinic aldehyde, while for the preparation of preferred products of the invention there are employed complex oxygen-containing polyamines having average or apparent molecular weights from about 2½ to about 6 times the molecular weight of the alpha,beta-olefinic aldehyde. For example, suitable complex oxygen-containing polyamines prepared by hydrogenating the material produced by treating acrolein with an excess of ammonia have average or apparent molecular weights generally within the range of from about 135 to about 330, although there may be employed in accordance with the present invention such complex oxygen-containing polyamines of the hereinbefore and hereinafter described character having average or apparent molecular weights as high even as 1200 or more. When there is employed a primary monoamine instead of ammonia, the average molecular weight of the complex oxygen-containing polyamines may be higher than that of the oxygen-containing polyamines prepared with ammonia. The ratio of the molecular weight of the complex oxygen-containing polyamines to the equivalent weight (the equivalent weight being determined, for example, by titration with acid, e. g., hydrochloric, perchloric or other suitable acid) is generally within the range of from about 2 to about 15, and preferably will be from about 2½ to about 6. Especially preferred complex oxygen-containing polyamino materials are those which have equivalent weights within the range of from about 60 to about 90.

The complex oxygen-containing polyamines which are employed in accordance with the invention contain carbon, nitrogen, hydrogen, and in addition thereto oxygen, generally in an amount from about 2% up to about 20%, preferably from about 5% to about 15%, on a weight basis. They contain an average of more than two nitrogen atoms per molecule, as judged by a comparison of the average or apparent molecular weight with the average or apparent equivalent weight. It is characteristic of these complex oxygen-containing polyamines that they are non-volatile, or remain non-vaporous, at temperatures as high as 100° C. under a pressure as low as 15 millimeters of mercury.

The unsaturated aldehydes from which these complex oxygen-containing polyamines may be prepared are broadly speaking those aldehydes that contain an aliphatic carbon-to-carbon multiple linkage interconnecting two carbon atoms, one of which is directly attached to the carbon atom of the formyl group. A particularly preferred group of unsaturated aldehydes which may be used in the preparation of these polyamines comprises acrolein and its homologs. A most highly preferred group comprises the alpha-methylene alkanals, that is, the aldehydes represented by the formula

where R represents the hydrogen atom or an alkyl radical. This especially preferred group of unsaturated aldehydes includes, among others, acrolein, methacrolein, alpha-ethylacrolein, alpha-propylacrolein, alpha-isopropylacrolein, alpha-butylacrolein, alpha-isobutylacrolein, alpha-t-butylacrolein, alpha-pentylacrolein, alpha-neopentylacrolein, the alpha-hexylacroleins and the various homologous and analogous unsaturated aldehydes which correspond to the above formula. Unsaturated aldehydes which do not correspond to the above formula but which may be employed in accordance with the broader aspects of the invention include, among others, crotonaldehyde, alpha-ethyl-beta-propylacrolein, propargyl aldehyde, cinnamaldehyde, alpha-methyl-beta-ethylacrolein, tetrolaldehyde, alpha-isopropyl-beta-isobutylacrolein, and the like and their various homologs and analogs and substitution products.

To prepare these complex oxygen-containing polyamines, the aldehydes of this particular type are condensed with ammonia or primary amines, the amine preferably being one of the aliphatic monoamine type, the ammonia or amine being present in excess and up to about 100 moles per mole of the unsaturated aldehyde and preferably in an amount corresponding to from about 2 to about 20 moles per mole of the unsaturated aldehyde, and the condensation products are catalytically hydrogenated to obtain the oxygen-containing polyamines that are employed in accordance with the invention. The condensation of the unsaturated aldehyde with the ammonia or primary amine or mixtures thereof preferably is conducted in liquid phase, but vapor phase conditions may also be used. Among the various primary amines which may be employed, use of those of the aliphatic monoamine, preferably saturated type, containing from 1 to about 24 carbon atoms, results in the formation of complex oxygen-containing polyamines from which there may be prepared especially satisfactory product of the character to which the invention relates. These preferred amines are represented not only by the lower monoalkyl amines, such as methylamine, ethylamine, propylamine, isopropylamine, butylamine, isobutylamine, but also by higher or long-chain monoalkyl amines, such as stearylamine, palmitylamine, oleylamine, etc., the monoalkyl primary monoamines containing from 1 to 4 carbon atoms being especially suitable. The preferred nitrogen-containing reactants, i. e., ammonia or primary amine, will be seen to be a compound containing an $NH_2$— radical as the sole functional group, and to be devoid of elements other than carbon, hydrogen and nitrogen. For the condensation of the unsaturated aldehyde with the ammonia or primary amine, a preferred temperature range is from about the freezing temperature of the reaction mixture to about $+150°$ C. With ammonia, temperatures as low as $-70°$ C. thus may be used. Liquid ammonia is a particularly favored reactant. The ammonia may be maintained in the liquid state by use of suitable low temperatures, by pressure, or both. Especially satisfactory products of the invention have been prepared from the complex oxygen-containing polyamines prepared by condensing the unsaturated aldehyde in and with liquid ammonia, the excess of ammonia serving as a solvent in the condensing mixture. For the hydrogenation, the known hydrogenation catalysts, such as nickel, iron, cobalt, copper or other base metals or compounds of the same, or platinum, palladium, and other noble metals, may be used. Suitable hydrogenating conditions involve hydrogen pressures of from about 100 to about 10,000 or more pounds per square inch and temperatures of from about $50°$ C. to about $150°$ C., although these limits are not known to be critical and either milder or more severe conditions may be employed if desirable. The hydrogenation may be carried out in the presence of inert organic solvents, such as lower aliphatic alcohols, hydrocarbon solvents, etc. The hydrogenation may take place concurrently with or subsequent to the condensation of the alpha,beta-unsaturated aldehyde and the ammonia or primary amine.

For the preparation of the novel products to which the invention relates, these complex oxygen-containing polyamines are condensed with one or more carboxylic acids of relatively high molecular weight. Suitable carboxylic acids include, for example, fatty acids and other fat acids, containing eight or more carbon atoms, naphthenic acids, wax acids, resin acids, rosin acids and chemically modified rosin acids, as well as crude, natural, or artificial mixtures containing the same, such as tall oil, red oil, turkey red oil, and also crude acids obtained by saponification of natural glyceride oils, such as peanut, rape, palm, whale, tung, cocoanut, linseed, cottonseed, fish or other oil, tallow, or the like. Especially preferred products are realized when tall oil is employed as the relatively high-molecular weight component, such tall oil being, if desired, a refined tall oil. Preferred carboxylic acids have molecular weights upwards from about 140, and preferably within the range of from about 200 to about 500. The $C_{12}$ to $C_{20}$ fatty acids form a preferred group, inclusive of oleic, stearic, lauric, palmitic, myristic, arachidic, ricinoleic, petroselinic, vaccenic, linolenic, linoleic, eleostearic, licanic, parinaric, tariric, gadoleic, arachidonic, palmitoleic, hydnocarpic, chaulmoogric, gorlic, and like fatty acids. Unsaturated fatty acids are preferred, oleic acid being a preferred member of the group.

While in the preferred case the carboxylic acid is employed in the free or uncombined state, in other cases suitable derivatives, such as an acid halide, acid anhydride, or ester, of the carboxylic acid may be employed without exceeding the scope of the invention.

In the preparation of the novel products of the invention, the proportion of the relatively high molecular weight carboxylic acid relative to the amount of the complex oxygen-containing polyamine may be varied within reasonable limits. By judicious selection of suitable proportions, products having various desirable and useful characteristics are obtained. In general, the ratio of the amount of the relatively high molecular weight carboxylic acid to the amount of the complex oxygen-containing polyamine is conveniently expressed in terms of the number of stoichiometric equivalents of the former per stoichiometric equivalent of the latter. On this basis, a suitable general range includes ratios from as high as 100:1 to as low as 1:100, a preferred range being from about 25:1 to 1:25. Although either the carboxylic acid component or the complex oxygen-containing polyamine component can be employed in moderate excess, especially satisfactory products which have been prepared are those resulting from the use of an amount of the complex polyamine at least equivalent to the amount of the carboxylic acid. A particularly suitable range comprises that between equivalent ratios, expressed as above, from about 1:1 to about 1:10, although it will be understood that the broader aspects of the invention are not limited thereto.

The novel products may be prepared by mixing the relatively high molecular weight carboxylic acid and the complex oxygen-containing polyamine and heating the mixture under substantially anhydrous conditions. The total amount of each reactant may be added initially. In other cases, one or both of the reactants may be added portionwise, continuously or intermittently, to the reacting mixture. An initial mixture may be prepared and reaction effected therein, the mixture subsequently divided into a plurality of portions, one or more of which is or are treated with an additional amount of a selected reactant and then combined or blended. The reaction may if desired be conducted in the presence of or with the aid of gaseous agents, which may react, as in the case of carbon dioxide, hydrogen chloride, ammonia, methylamine, etc., or may serve, for example, as entraining agents which assist in removing volatile material, e. g., water, from the reaction mixture, as in the case of inert gases, such as nitrogen. The reaction may be conducted in the presence of inert organic solvents or diluents, such as aromatic hydrocarbons, e. g., toluene, xylene, benzene, etc., aliphatic hydrocarbons, such as iso-octane, halogen-substituted hydrocarbons, such as chloroform, or other suitable solvent. Water formed by the reaction may be removed continuously by vaporizing an azeotropic mixture of water and a suitable organic solvent which forms azeotropic mixtures with water and which is added to the reaction mixture, e. g., xylene. Although reaction between the complex oxygen-containing polyamine and the carboxylic acid reactant can be effected at temperatures as low as 100° C., the most valuable products have been obtained by operating at temperatures above about 150° C. and preferably above about 200° C. Temperatures as high as about 350° C. may be employed upon occasion, a preferred range being from about 150° C. to about 240° C. During the reaction, the reaction mixture conveniently may be maintained under the atmospheric pressure, or superatmospheric or subatmospheric pressures may be used.

The products to which the invention relates, while of undetermined, but evidently complex, structure, comprise at least in part products obtained by replacing nitrogen-bonded hydrogen of the oxygen-containing polyamine reactant by the acyl (R—CO—) radical of the carboxylic acid or derivative employed as reactant. The products of the invention appear to have some characteristics of poly-N-acyl polyalkylol polyalkylene polyamines. The products formed at the lower temperatures, viz., at reaction temperatures up to about 200° C. are thought to contain soap or salt-type linkages, represented by the formula

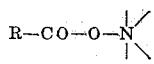

in which R—CO— again represents the acyl radical of the relatively high-molecular weight carboxylic acid reactant. Ester linkages, which are thought to be formed by reaction of the carboxylic acid reactant with hydroxyl groups of the oxygen-containing polyamine reactant are represented by the formula

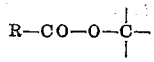

The products produced under the more severe conditions, especially at temperatures above about 200° C. are thought to contain only minor amounts, if any, of soap or salt-type linkages, the predominant formation of N-acylamino groupings, represented by the formula

being favored by the higher temperatures. The higher temperatures are thought further to favor the formation of ester-type linkages to a greater extent than at the lower temperatures.

The new products of the invention range at ordinary or room temperatures from hard wax-like materials to soft unctuous salves and in some cases to viscous liquids. Their color is in general from a pale tan to a dark brown or reddish-brown. Little, if any, color develops during their preparation from the relatively high molecular weight carboxylic acid and the complex oxygen-containing polyamine, hence, by selecting reactants having desired color characteristics, the new products can be prepared in a form characterized by advantageous freedom from excessive coloration. The new products to which the invention relates are generally substantially insoluble in water, although they may be dissolved in acid and may be solubilized by treatment with strong alkalies. They may be dissolved in suitable organic solvents, such as ketones, petroleum ether and other suitable petroleum fractions, aromatic hydrocarbon solvents, etc. They may be emulsified in water with the aid of suitable acids, such as hydrochloric, acetic, tartaric, citric, lactic, or like acid and/or known emulsifying agents, such as sulfonated long-chain alcohols, alkylaryl sulfonates, water-dispersible salts of long-chain amino-alkane-sulfonic acids, or the like, if desired with addition of a stabilizing agent, such as solubilized casein, carboxymethyl cellulose, albumin, agar, etc. The new products prepared with an amount of the carboxylic reactant less than that that is equivalent to the complex oxygen-containing polyamine reactant, are in general characterized by a high melting point or range and by a low viscosity coefficient, which means that, upon heating, their viscosity decreases only slowly with the increase in temperature, the products prepared when tall oil is used as the carboxylic acid reactant being especially advantageous in this respect. They exhibit marked advantages, which contribute significantly to their utility in various arts, in the nature of outstanding and lasting resistance to adverse conditions of elevated temperatures and to oxidation. The durability of the new products under conditions of elevated temperatures, in the presence of light, and/or under oxidative conditions, when alone or mixed with other materials, is one of their most valuable known characteristics.

The novel reaction products of such relatively high molecular weight carboxylic acids with the hereinbefore and hereinafter described complex oxygen-containing polyamines, to which the invention relates, are useful as agents to be employed in the manufacture of textiles. They may be employed as thread lubricants, application to the thread being according to well-known methods, e. g., in the form of a dilute solution or dispersion thereof. They may also be applied to the woven textile, to produce desired modification in the characteristics thereof, especially in the softness, handle, durability, and drape of such textiles. The new products of the invention are useful in the manufacture of rope, from natural as well as synthetic fibers, increased strength and durability being imparted to the rope by the lubricating and weatherproofing action of the materials thus employed. The products of the invention also are useful in the manufacture of paper and other laid or felted fabrics. In the making of paper, emulsions or suitable solutions of the novel acylated complex oxygen-containing polyamines may be added to the beater, in conjunction with known sizing materials, such as rosin soaps, if desired. The new products of the invention are further useful in the treatment of leather, as by application thereto alone or with known leather-finishing agents to impart softness, flexibility, scratch-resistance and other desired characteristics.

The acylated complex oxygen-containing amines of the invention may be mixed or blended with various materials to form useful compositions of matter. They may be mixed with waxes, such as waxes of petroleum origin and waxes derived from plants. The mixtures, as such or with addition of solvent, stain or the like, and/or emulsified in water, are useful as or in floor, furniture, automobile, and like polishes, and for the coating of fabrics, such as paper, cloth, felt, etc. The novel products of the invention may be mixed with lubricants, especially of petroleum origin, to modify their properties, such as pour point, viscosity index, or the like, and with bituminous materials, such as various asphalts, to form bituminous compositions having improved adhesion and compression characteristics. The products to which the present invention relates are also useful for stabilizing greases containing silica or like inorganic gel.

The following examples are illustrative of the invention:

EXAMPLE I

This example illustrates a process for the preparation of complex oxygen-containing polyamines from which the novel products of the invention are prepared, and a product of a preferred type provided by the invention.

A steel 6-gallon autoclave, suitable for hydrogenation reactions and provided with thermometer, power-driven stirrer, pressure gauge, and suitable valved inlets and outlets, was charged with 6 pounds of a concentrated slurry of Raney nickel hydrogenation catalyst in water and the water removed by evaporation while sweeping out the interior of the autoclave with a stream of hydrogen. To the autoclave there then were charged 17 pounds of anhydrous ammonia and the temperature of the closed autoclave was raised to 100° C. The pressure in the autoclave then was raised to about 1000 pounds per square inch by addition of hydrogen under pressure. A concentrated solution of 5.56 pounds of acrolein in methanol then was charged to the autoclave over a period of about 5 minutes while cooling the autoclave to maintain the temperature below about 100° C. The pressure then was increased to 1500 pounds per square inch by further addition of hydrogen. After the hydrogenation reaction had proceeded for one hour at 100° C., the reaction mixture was discharged through a filter (to remove the catalyst) to a container cooled by solid carbon dioxide applied to the exterior and then was allowed to warm to room temperature. Remaining traces of the excess ammonia were taken off by heating at 50° C., and low-boiling materials were removed by heating at 120° C. under 10 millimeters of mercury pressure. There remained in the vessel about 0.784 pound of the complex oxygen-containing polyamines per pound of acrolein applied. The equivalent weight (determined by titration of aliquots with acid) of the complex oxygen-containing polyamines prepared in a number of experiments carried out according to the foregoing ranged from about 64 to about 73. A representative analysis of a product prepared in this manner is as follows: carbon, 58.5%; hydrogen, 10.8%; nitrogen, 20.4%; oxygen (by difference), 10.3%; basicity (by titration with aqueous perchloric acid), 1.29 equivalents per 100 grams.

For the preparation of the product of the present invention, the complex oxygen-containing polyamine prepared in the above-described manner was mixed with oleic acid in the proportion of 3 equivalents of the polyamine per equivalent of oleic acid and the mixture heated with stirring in a vessel open to the atmosphere. The temperature was raised to 240° C. and maintained at this temperature until evolution of volatile material ceased as evidenced by cessation of frothing. The product then was cooled. At room temperature the product was a brown, slightly fluorescent, waxy solid having a faint but not objectionable musty odor. At 120° C. it was a thick viscous liquid. It was soluble in hydrocarbon solvents.

EXAMPLE II

In order to illustrate the usefulness of the product of the foregoing example in the manufacture of improved bituminous compositions, the influence of the product upon the retention of a continuous film of asphalt on a solid surface was determined as follows: A concentrated solution of a portion of the product in an equal weight of high-boiling aromatic petroleum solvent was prepared and added in suitable amounts to portions of the asphalts listed in the table given below. Six parts of each of the asphalt compositions thus prepared were mixed separately with 100-part portions of a soda rhyolite aggregate graded between ½ inch (100% passing) and ¼ inch (100% retained) sieves. The aggregate had 2% by weight of water on its surface. In each case the coating of the aggregate was substantially complete when the composition was spread out on a tin plate. After standing in the open air at room temperature for one hour, each sample of the coated aggregate was immersed in distilled water for 20 hours at room temperature, after which the percent of asphalt coating retained on the aggregate was visually estimated.

In order to test the heat stability, additional samples of the asphalts to which the product of the foregoing example had been added were heated at 121° C. for 168 hours, and then tested for retention on soda rhyolite in the same manner as above.

The results that were obtained are presented in the following table. The first column shows the source of the asphalt employed. The second column gives the amount of the product of Example I that was added, based upon the weight of the asphalt. The third and fourth columns give the percent of the coating retained on the coated soda rhyolite after the 20 hours' immersion in water.

Table I

| Source of Asphalt | Concentration of Acylated Polyamine, Percent by Weight | Percent Retention of Coating | |
|---|---|---|---|
| | | Without Prior Heating of Asphalt | With Prior Heating of Asphalt at 121° C. for 168 Hours |
| San Joaquin Valley Crude | none added | 5 | 5. |
| Do | 0.5 | 98 | 90. |
| Do | 1.0 | 100 | 100. |
| Gulf Coast Crude | none added | 5 | 5. |
| Do | 0.5 | 100 | 100. |
| Do | 1.0 | 100 | 100. |
| Venezuelan Crude | none added | 5 | 5. |
| Do | 0.5 | 100 | 98. |
| Do | 1.0 | 100 | 100. |
| Mid-Continent Crude | none added | 5 | 5. |
| Do | 0.5 | 85 | not tested. |
| Do | 1.0 | 100 | 85. |

That the acylated polyamine is effective for treatment of asphalts from widely different sources is seen from a comparison of the results that are reported for the various asphalts employed, in each case as little as 0.5% of the acylated polyamine leading to a notable improvement in the retention characteristics of the asphalt, and in every case 100% retention being observed with the untreated samples of asphalt containing as little as 1% by weight of the acylated oxygen-containing polyamine. The desirable duration of the beneficial effect upon exposure of the asphalt to conditions such as are encountered under storage at elevated temperatures or shipment in heated tank cars is shown by a comparison of the results in the last column with those in the next preceding column.

EXAMPLE III

A further preparation of an acylated oxygen-containing polyamine of the invention is illustrated in this example. For the preparation of this product there was employed a complex oxygen-containing polyamine which had been made substantially according to the method described in Example I and which had the following characteristics: equivalent weight, 70; carbon content, 61.4%; hydrogen content, 10.8%; nitrogen content, 19.9%; oxygen content (by difference), 7.9%. The oxygen-containing polyamine was mixed with oleic acid in amounts corresponding to 3 equivalents of the polyamine per equivalent of oleic acid and heated at 240° C. for 15 minutes, at which time frothing ceased. The product then was cooled. The product was a waxy solid having a brownish color. It could be employed as an ingredient in automobile or like polishes, and also appeared to be useful as a coating material for the protection of iron or steel surfaces against rusting.

EXAMPLE IV

In order to test the effectiveness of the acylated complex oxygen-containing polyamine as a surface-active agent, the product prepared in the preceding example was converted to the hydrochloride salt by treatment with hydrochloric acid and 0.25 part of the salt were dispersed in 100 parts of distilled water at about room temperature. The surface tension of the solution was found to be 35.4 dynes per square centimeter compared to the value of 72.7 dynes per square centimeter for the surface tension of the water alone.

EXAMPLE V

In this example there is illustrated the preparation of the product of the invention by reaction of a complex oxygen-containing polyamine with oleic acid in the portion of two equivalents of the polyamine per equivalent oleic acid. The oxygen-containing polyamine used was a further sample of the one described in Example III. The oxygen-containing polyamine and the oleic acid were mixed and the mixture heated with stirring at 240° C. for 15 minutes, at which time foaming had ceased, and then cooled. The resulting product was softer than the product described in Example I, lighter in color, and showed a definite tendency to refract light internally.

EXAMPLE VI

A still further acylated complex oxygen-containing polyamine was prepared from the polyamine described in Example III by heating with an equivalent amount of oleic acid at 240° C. for 15 minutes. The resulting product was a viscous liquid having excellent color characteristics.

EXAMPLE VII

The effectiveness of the products prepared in Examples III, V and VI for improving the retention characteristics of asphalt were determined by means of the "Total Water Immersion Test," using a granitic aggregate. The "Total Water Immersion Test" is carried out substantially as follows:

Five hundred grams of an aggregate passing 1.5 inch screen but retained by 0.75 inch screen are immersed in water for 30 minutes, drained and then thoroughly mixed for 5 minutes with 35 grams of the asphalt to be tested. The coated rock then is placed in a wide-mouth closed pint jar. After standing for 30 minutes, the contents of the jar are covered with distilled water and the jar is closed and held at 105° F. for 3 hours. The aggregate while under water then is inspected and the surface which has remained covered is estimated visually. The result is expressed as the number of tenths of the surface, rounded to the nearest integer, that remain covered, and is reported as the T. W. I. T. value. It will be seen, for example, that if the T. W. I. T. value is 10, it signifies that the stones remain on the average 95% or more covered with the asphalt; if the T. W. I. T. value is 5, they remain 45% to 55% covered.

The result obtained in this manner upon addition of samples of the aforesaid products to various asphalts and testing of the resulting mixtures are described in the following table:

Table II

| Source of Asphalt | Oleic Acid-polyamine Reaction Product | | T. W. I. T. Value |
|---|---|---|---|
| | Example in Which Prepared | Amount Added | |
| San Joaquin Valley Crude | None Added | | 2 |
| Do | III | 0.5 | 9 |
| Do | III | 1.0 | 10 |
| Do | V | 1.0 | 9 |
| Do | VI | 1.0 | 10 |
| Gulf Coast Crude | None Added | | 2 |
| Do | III | 0.5 | 10 |
| Do | III | 1.0 | 10 |
| Do | V | 1.0 | 10 |
| Do | VI | 1.0 | 10 |
| Venezuelan Crude | None Added | | 2 |
| Do | III | 0.5 | 10 |
| Do | III | 1.0 | 10 |
| Do | V | 1.0 | 10 |
| Do | VI | 1.0 | 9 |
| Mid-Continent Crude | None Added | | 2 |
| Do | III | 0.5 | 7 |
| Do | III | 1.0 | 10 |

The foregoing results illustrate further the effectiveness of the present novel products for improving the adhesion characteristics of asphalts. Further tests carried out according to the Total Water Immersion Method in which the asphalt containing the additive was initially heated for 7 days at 121° C. confirmed the conclusion as to stability of the additives under conditions encountered in storage, shipment or application of asphalts, which was reached on the basis of the evidence described in Example II.

EXAMPLE VIII

This example illustrates a product obtained by reacting oleic acid with a hydrogenated high-boiling condensation product of crotonaldehyde and ammonia. For the preparation of the hydrogenated polyamine there was placed in the autoclave used in Example I, about 70 parts of Raney nickel hydrogenation catalyst and 410 parts of anhydrous ammonia. The closed autoclave was heated to about 100° C. and hydrogen under pressure was introduced until the pressure within the autoclave was raised to about 1000 pounds per square inch. A concentrated solution of crotonaldehyde in ethanol was added to the autoclave with cooling to maintain the temperature at about 100° C., until 210 parts of crotonaldehyde had been added, 25 minutes being taken for the addition. The contents of the autoclave then were held for an additional 40 minutes at 100° C. with addition of hydrogen to maintain the pressure at 1000 pounds per square inch. The resulting mixture was withdrawn from the autoclave, filtered to remove the catalyst, and the excess of ammonia and low-boiling materials evaporated by heating.

A portion of the solid high-boiling oxygen-containing polyamines prepared in this manner (basicity 0.96 equivalents per 100 grams) was mixed with oleic acid in the proportion of 3 equivalents of polyamine per equivalent of oleic acid and the mixture heated at 240° C. with stirring for about 20 minutes. The product then was cooled. The product thus prepared was at room temperatures a hard waxy dark solid, somewhat harder than corresponding products prepared from the oxygen-containing polyamines produced from acrolein. At 120° C. the product was a viscous sticky mass.

EXAMPLE IX

This example illustrates a product prepared from the complex oxygen-containing polyamine described in Example VIII employing tall oil instead of oleic acid. For the preparation of this product a further sample of the oxygen-containing polyamine prepared from crotonaldehyde in Example VIII was heated with tall oil in the proportion of 3 equivalents of oxygen-containing polyamine per equivalent of tall oil, the reaction being conducted at 240° C. for 20 minutes, and cooling to obtain the final solid product.

EXAMPLE X

A still further example of the products of the invention is furnished by one prepared from the polyamine produced in Example VIII and naphthenic acid. For the preparation of this product 3 equivalents of the complex oxygen-containing polyamine were mixed with 1 equivalent of naphthenic acids and the mixture heated with stirring at 240° C. for 20 minutes and cooled.

EXAMPLE XI

This example illustrates the novel product of the invention as it may be prepared from complex oxygen-containing polyamines derived from acrolein, and naphthenic acids. A sample of a complex polyamine produced as in Example I was mixed with naphthenic acid (molecular weight, 250) in the proportion of 3 equivalents polyamine per equivalent of naphthenic acid and the mixture heated with stirring at 240° C. until foaming ceased. The resulting product upon cooling was a brownish waxy solid at room temperature. At 120° the product was a thick viscous liquid which showed excellent stability at such elevated temperatures.

EXAMPLE XII

Example XI is repeated, substituting for the naphthenic acids having an average molecular weight of 250, naphthenic acids having an average molecular weight of 395.

EXAMPLE XIII

A still further portion of the polyamine prepared in Example I was mixed with tall oil in the proportion of 3 equivalents polyamine per equivalent of tall oil and the mixture heated with stirring at 240° C. until foaming ceased. The resulting product upon cooling to room temperature was a dark hard waxy solid. It was completely miscible with petroleum solvents having high content of aromatics. By warming to 120° C., solutions in such solvents having a concentration as high as 50% were easily prepared.

EXAMPLE XIV

A further product of the invention is illustrated by one prepared from the complex oxygen-containing polyamines such as those prepared in Example I, and wax acids. For the preparation of this product a sample of the polyamine prepared in Example I was mixed with wax acids in the proportion of 3 equivalents polyamine per equivalent of the wax acids. The wax acids employed were such as are produced by the oxidation of petroleum wax and consisted mainly of a mixture of organic acids varying in molecular weight and containing in addition to straight-chain acids, oxygenated acids, such as hydroxy acids, keto acids, ketohydroxy acids and the like. The acid number of the wax acids was about 116. The mean molecular weight was about 475.

The product thus prepared upon cooling was a soft waxy solid having a somewhat greasy feel and a good color.

EXAMPLE XV

This example illustrates a process for the preparation of the products of the invention wherein water formed by the reaction is continuously removed by distillation from the reaction mixture in azeotropic mixture with a suitable added organic solvent. In this experiment a sample of the oxygen-containing polyamine produced as in Example I was mixed with oleic acid in a proportion of 3 equivalents of polyamine per equivalent of oleic acid. To the mixture there was added an approximately equal weight of xylene. The resulting mixture was heated in a reaction vessel equipped with a reflux condenser arranged for continuous off-take at the condenser head of the xylene-water azeotrope, stratification of the condensed azeotropic mixture and return of the xylene layer to the reaction vessel. The reaction was continued by heating at 150° C. with removal of water in this manner until 1 mole of water was removed per equivalent of oleic acid used. The reaction mixture then was heated to distill off the xylene, residual traces being removed by heating in vacuo. The product was lighter in color then corresponding products produced by simply heating the reactants together and was characterized by a high bloom.

EXAMPLE XVI

A further product was prepared by reacting a sample of the polyamine prepared in Example I with tall oil in a 3/1 ratio of polyamine to tall oil acids on an equivalent basis, at 240° C. for approximately 10 minutes. The resulting product was cooled to room temperature and the N-acylated oxygen-containing polyamine treated by addition at about room temperature of one equivalent of oleic acid for every 3 equivalents of the polyamine used. The resulting product appeared to be composed predominantly of the oleic acid soap (salt) of the N-acylated complex oxygen-containing polyamine.

EXAMPLE XVII

The immediately preceding example was repeated, substituting naphthenic acids for the tall oil, and the oleic acid soap prepared.

EXAMPLE XVIII

This example illustrates a reaction product of the complex oxygen-containing polyamines prepared in Example I with tall oil fortified by addition of oleic acid. To tall oil there was added about 10% by weight of oleic acid and the resulting mixture was heated at about 180° C. for about 30 minutes with 3 equivalents of the polyamine prepared in Example I, and then cooled.

EXAMPLE XIX

In the preparation of the product of this example the complex polyamines were prepared by reacting acrolein with ammonia present in a mole ratio of 2 moles ammonia per mole of acrolein and hydrogenating the products. The procedure employed in Example I was followed except that the amount of ammonia was reduced to correspond with the desired mole ratio. The high boiling polyamines were recovered by filtering the catalyst from the reaction mixture and heating the reaction mixture to a temperature of 120° C. under 12 millimeters mercury pressure to remove lower boiling products. A mixture of the oxygen-containing polyamine thus prepared with one equivalent of tall oil for every 3 equivalents of oxygen-containing polyamine was heated at 240° C. for 10 minutes and cooled to obtain the desired product.

EXAMPLE XX

A complex oxygen-containing polyamine, which had been prepared as in Example I, was mixed and heated at 180° C. for 45 minutes with refined, steam-distilled tall oil, the proportions of the reactants being 3 equivalents of the polyamine per equivalent of tall oil acids.

The resulting material, which was a mixture of the tall oil soaps and amides of the complex oxygen-containing polyamine, was mixed with the asphalts listed in the following table, to give a concentration of 1% based upon the weight of the asphalt. Each sample of the asphalt containing the additive then was divided into two parts. One part was tested without further treatment according to the method described in Example II, upon three types of aggregate. The other part was heated 7 days at 120° C. and then tested in the same manner on further samples of the same aggregates. The following results were observed:

*Table III*

| Source of Asphalt | San Joaquin Valley Crude | | Mid-Continent Crude | |
|---|---|---|---|---|
| | With 1% of Additive | Control (No Additive) | With 1% of Additive | Control (No Additive) |
| Percent Coating Retained: | | | | |
| On Rhyolite— | | | | |
| Without prior heating | 100 | 5 | 100 | 5 |
| With prior heating | 80 | | 95 | |
| On Granite— | | | | |
| Without prior heating | 100 | 10 | 100 | 10 |
| With prior heating | 100 | | 100 | |
| On Limestone— | | | | |
| Without prior heating | 80 | 10 | 100 | 10 |
| With prior heating | 50 | | 80 | |

This application is a continuation-in-part of our copending application, Serial No. 777,110, filed September 30, 1947, now U. S. Patent No. 2,520,720, dated August 29, 1950.

We claim as our invention:

1. As a new composition of matter, an N-acyl-substituted polymeric oxygen-containing polyamino material, which polymeric oxygen-containing polyamino material is produced by condensing acrolein in and with an excess of anhydrous liquid ammonia present in an amount corresponding to about 10 moles of ammonia per mole of acrolein, catalytically hydrogenating the products of the condensation, and removing materials boiling below about 100° C. under a pressure of about 15 millimeters of mercury to leave a residuum comprising said polymeric oxygen-containing polyamino material, which N-acyl-substituted polymeric oxygen-containing polyamino material is formed by heating above 200° C. said polymeric oxygen-containing polyamino material with tall oil present in an equivalent ratio of about 3:1 and removing from the reaction mixture the water formed by the reaction of the carboxyl groups of the acids contained in tall oil with the said polymeric polyamino material.

2. As a new composition of matter, an N-acyl-substituted mixture of polymeric oxygen-containing polyamino materials, which mixture of polymeric oxygen-containing polyamino materials is produced by condensing acrolein in and with liquid anhydrous ammonia present in an amount corresponding to from 2 up to about 20 moles per mole of acrolein and catalytically hydrogenating the products of the condensation, said mixture of polymeric oxygen-containing polyamino materials containing from about 5% to about 15% of oxygen on a weight basis and being substantially non-volatile at a temperature of about 100° C. under a pressure of about 15 millimeters of mercury, which N-acyl-substituted mixture of polymeric oxygen-containing polyamino materials is formed by heating at a temperature above 200° C. said mixture of polymeric oxygen-containing polyamino materials with a fatty acid containing from 12 to 20 carbon atoms present in an amount corresponding to from about 1/25 to about 25 equivalents per equivalent of the polyamino material and removing from the reaction mixture the water formed by the reaction of the carboxyl groups of the fatty acids with the said mixture of polymeric oxygen-containing polyamino materials.

3. As a new composition of matter an N-acyl-substituted polymeric oxygen-containing polyamino materials, which polymeric oxygen-containing polyamino materials are produced by condensing acrolein in and with liquid anhydrous ammonia present in an amount corresponding to from about 2 up to about 20 moles per mole of acrolein and catalytically hydrogenating the products of the condensation, said polymeric oxygen-containing polyamino materials containing from about 2 to about 20% of oxygen on a weight basis and having an equivalent weight within the range of from about 60 to about 90 and an average molecular weight of from about 135 to about 330, which N-acyl-substituted polymeric oxygen-containing polyamino material is formed by heating at a temperature above 200° C. said polymeric oxygen-containing polyamino materials with a plurality of carboxylic acids having molecular weights within the range of from about 200 to about 500 and removing from the reaction mixture the water formed by the reaction of the carboxyl groups of the said carboxylic acids with the said polymeric oxygen-containing polyamino materials.

4. As a new composition of matter, an N-acyl-substituted polymeric oxygen-containing polyamino material, which polymeric oxygen-containing polyamino material is produced by condensing acrolein with an amino compound selected from the group consisting of ammonia and the primary amines, said amino compound being present in excess and in an amount corresponding to from about 2 up to about 100 moles per mole of acrolein, and catalytically hydrogenating the products of the condensation, said polymeric oxygen-containing polyamino materials containing from about 2% to about 20% of oxygen on a weight basis and having an equivalent weight from about 1/2 to about 1/15 the molecular weight, which N-acyl-substituted polymeric oxygen-containing polyamino material is formed by heating at a temperature above 200° C. said polymeric oxygen-containing polyamino material with a carboxylic acid having a molecular weight greater than about 140 and removing from the reaction mixture the water formed by the reaction of the carboxyl groups of the carboxylic acid with the said polymeric oxygen-containing polyamino material.

5. As a new composition of matter, an N-acyl-substituted polymeric oxygen-containing polyamino materials, which polymeric oxygen-containing polyamino materials are produced by condensing acrolein with a lower monoalkyl primary amine present in excess and in an amount corresponding to from about 2 up to about 100 moles per mole of the acrolein and catalytically hydrogenating the products of the condensation, said polymeric oxygen-containing polyamino materials containing from about 2% to about 20% of oxygen on a weight basis, which N-acyl-substituted polymeric oxygen-containing polyamino materials are formed by heating at a temperature above 200° C. said polymeric oxygen-containing polyamino materials with carboxylic acids having a molecular weight greater than about 140 and removing from the reaction mixture the water formed by the reaction of the carboxyl groups of the carboxylic acids with the said polymeric oxygen-containing polyamino materials.

6. As a new composition of matter, an N-acyl-substituted polymeric oxygen-containing polyamino materials, which polymeric oxygen-containing polyamino materials are produced by condensing an alpha-methylene aldehyde with an amino compound selected from the group consisting of ammonia and the primary amines, said amino compound being present in excess and in an amount corresponding to from about 2 up to about 20 moles per mole of the alpha,beta-unsaturated aldehyde, and catalytically hydrogenating the condensation products, said polymeric oxygen-containing polyamino materials containing from about 2% to about 20% of oxygen on a weight basis and being substantially non-volatile at a temperature of about 100° C. under a pressure of about 15 millimeters of mercury, which N-acyl-substituted polymeric oxygen-containing polyamino materials are formed by heating at a temperature above 200° C. said polymeric oxygen-containing polyamino material with at least one carboxylic acid having a molecular weight greater than about 140 and removing from the reaction mixture the water formed by the reaction of the carboxyl groups of the carboxylic acid with the said polymeric oxygen-containing polyamino materials.

7. As a new composition of matter, an N-acyl-substituted polymeric oxygen-containing polyamino material, which polymeric oxygen-containing polyamino material is produced by condensing an alpha,beta-unsaturated aldehyde, the alpha,beta-unsaturation being of the aliphatic type, with an amino compound selected from the group consisting of ammonia and the primary amines, said amino compound being present in excess and in an amount corresponding to from about 2 up to about 100 moles per mole of the alpha,beta-unsaturated aldehyde, and catalytically hydrogenating the condensation products, said polymeric oxygen-containing polyamino material containing from about 2% to about 20% of oxygen on a weight basis, having an average molecular weight at least 2.5 times the molecular weight of said alpha,beta-unsaturated aldehyde and being substantially non-volatile at a temperature of about 100° C. under a pressure of about 15 millimeters of mercury, which N-acyl-substituted polymeric oxygen-containing polyamino material is formed by heating at a temperature above 200° C. said polymeric oxygen-containing polyamino materials with at least one carboxylic acid having a molecular weight greater than 140 and removing from the reaction mixture the water formed by the reaction of the carboxyl group of the carboxylic acid with the said polymeric oxygen-containing polyamino materials.

8. As a new composition of matter, an N-oleyl-substituted complex oxygen-containing polyamino material, which complex oxygen-containing polyamino material is produced by condensing an alpha-methylene aldehyde in and with an excess of liquid anhydrous ammonia and catalytically hydrogenating the products of the condensation, has an average molecular weight within the range of from about 135 to about 330 and is substantially non-vaporous at a temperature of about 100° C. under a pressure of about 15 millimeters of mercury, which N-oleyl-substituted complex oxygen-containing polyamino material is formed by heating the said complex oxygen-containing polyamino material with oleic acid at a temperature above 200° C. and removing from the reaction mixture the water formed by the reaction of the carboxyl group of oleic acid with the said polymeric oxygen-containing polyamino material.

DENHAM HARMAN.
HARRY J. SOMMER.

References Cited in the file of this patent

UNITED STATES PATENTS

| Number | Name | Date |
| --- | --- | --- |
| 2,379,413 | Bradley | July 3, 1945 |
| 2,393,202 | Stegemeyer | Jan. 15, 1946 |
| 2,402,495 | Haury | June 18, 1946 |